Jan. 8, 1963
I. C. McKECHNIE
3,072,777
HIGH FREQUENCY ELECTRODE VIBRATION
Filed March 25, 1960
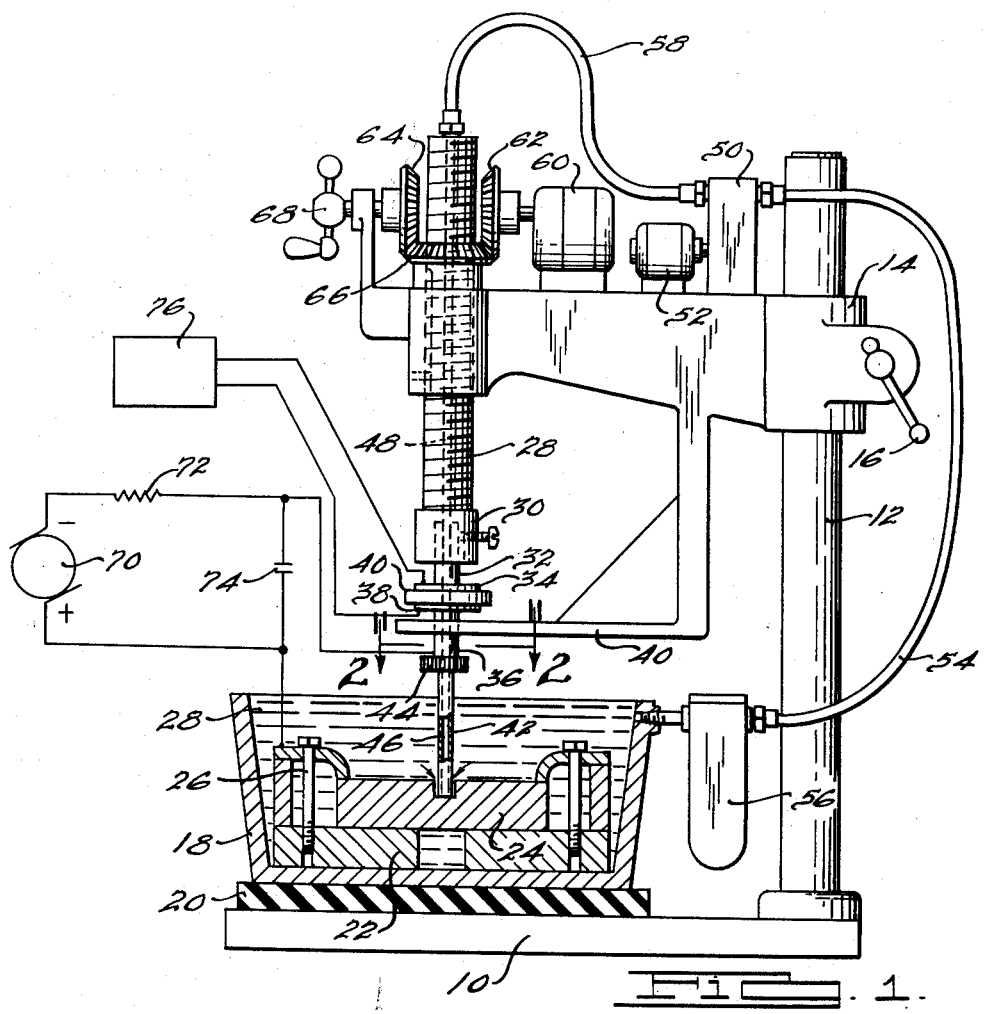
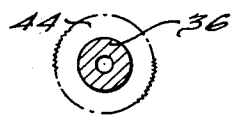
INVENTOR.
Ian C. McKechnie.
BY
M K Murphy
ATTORNEY.

United States Patent Office 3,072,777
Patented Jan. 8, 1963

3,072,777
HIGH FREQUENCY ELECTRODE VIBRATION
Ian C. McKechnie, Pontiac, Mich., assignor to Elox Corporation of Michigan, Troy, Mich., a corporation of Michigan
Filed Mar. 25, 1960, Ser. No. 17,570
3 Claims. (Cl. 219—69)

This invention relates to improvements in the art of electrical discharge machining, sometimes referred to as EDM, spark machining and electro-spark machining.

In patents previously issued to me, Numbers 2,654,256, 2,753,429 and 2,903,556, I have shown various means for vibrating an electrode for use in connection with electrical discharge machining, and for controlling the frequency of vibration. In Patent Number 2,903,556, I show means for vibrating the machining electrode at frequencies in the order of 35,000 cycles per second at amplitudes in the order of .001 to .000001 inch, for the purpose of breaking "stringers" in the working gap.

The apparatus shown in Patent Number 2,903,556 requires precision workmanship to manufacture and is consequently relatively expensive. It is the primary object of the present invention to provide improved apparatus for imparting high frequency vibratory movement to the EDM electrode that is relatively easy and economical to produce and which provides equal or better results than apparatus presently in use.

I utilize a transducer of the ferro-electric type in a novel combination for vibrating the electrode. Reference is made to the accompanying drawing for a preferred example of such a device.

In the drawings, in which reference characters have been used to designate like parts referred to in the following specification:

FIG. 1 is a vertical elevation, partly in section and partly schematic, showing a typical apparatus for practising the invention; and FIG. 2 is a detail sectional view on the line 2—2 of FIG. 1.

Referring now to the drawing, it will be seen that the apparatus shown comprises a base 10 which supports an upright column 12. A radial support 14 is adjustably mounted on the column and may be fixed in vertical position by the handle 16. The base carries a pan or container 18 which is electrically insulated therefrom by a dielectric pad 20. A mounting block 22 is disposed in the pan 18 for supporting a workpiece 24 which is secured in place by clamps and spacers designated by 26.

The container 18 is filled with dielectric fluid 28 which fluid covers the workpiece 24 and is circulated through the working gap. The arm 14 carries a threaded spindle 28 which is movable vertically relatively thereto. A chuck 30 is carried on the lower end of the spindle. The chuck 30 receives a smaller spindle 32 which has an integral plate 34 on its lower end. A third spindle member 36 having an integral plate 38 on its upper end is mechanically and electrically bonded to the plate 34 by means of a transducer element 40. The latter may be of barium titanate or of other suitable material as will be discussed below. The plates 34, 38, are preferably bonded to the transducer by conductive cement.

The spindle 36 is adapted to receive the upper portion of an electrode 42, a collet 44 being provided for securing the parts. To assure rigidity of the parts and accuracy of cut during operation, the spindle 36 is supported for vertical reciprocatory movement in a guide arm 46 carried by the arm 14.

The electrode 42 is shown by way of example as round, but it could be of almost any desired configuration depending upon the hole or cavity desired to be machined in the workpiece. The electrode has a central coolant passage 46 which connects with a passage 48 provided in the spindles, the transducer, etc. These passages provide for circulation of the coolant 28 under pressure to flush sludge from the working gap and supply a dielectric medium in the gap at all times.

The fluid circulation system includes a pump 50 driven by a motor 52. The pump draws fluid from the container 18 through a filter 56 and hose 54 and supplies it to the passage 48 through hose 58.

The electrode 42 is maintained in optimum gap position and is fed toward the workpiece 24 by an automatic power feed mechanism which comprises essentially a reversible electric motor 60 which embodies the necessary reduction gearing, and the bevel gears 62, 64. These gears mesh with a third bevel gear 66 carried by the threaded spindle 28. The gear 66 has an internally threaded depending portion which is rotatable in the arm 14. The threads of spindle 28 engage the threads of gear 66, and thus rotation of gear 66 will cause spindle 28 to be raised or lowered in accordance with the direction of gear rotation, the spindle being constrained against rotation by a pin and keyway as is common in the art.

Rough manual adjustment of the electrode feed may be made by rotation of handle 68, while automatic feed and adjustment is accomplished by the motor 60. The latter is controlled by a sensing device which senses conditions in the machining gap and causes the motor 60 to advance the tool 42, retract it or hold it stationary in accordance with gap operating conditions. This feed control device is not necessary to an understanding of the present invention and details thereof have been omitted for the sake of brevity.

Any suitable type of power supply for the gap may be used. I have shown schematically a simple RC or relaxation oscillator circuit which comprises a voltage source 70, a resistor 72 and a condenser 74 connected to the workpiece 24 and the electrode 42 with the electrode negative. With such a power source, the condenser 74 is charged repetitively from the source 70 and discharges intermittently across the gap in accordance with the circuit parameters.

As pointed out above, high frequency, extremely small amplitude vibration of the electrode is desirable in machining. I employ a transducer 40 to accomplish this.

The transducer 40 may be made of a number of suitable materials. Any material having piezoelectric properties and having its crystalline structure so arranged that it will shorten and lengthen dimensionally in the direction of the electrode axis, and of sufficient mechanical strength is suitable. For example, barium titanate or barium strontium titanate, bonded with ceramic binder may be used. Other, although less suitable, examples are calcium titanate, magnesium titanate and aluminum titanate.

Generally speaking, I prefer to use piezoelectric transducers of substantial thickness as compared to those used in purely control applications. Metallic titanates in the form of ceramic wafers of from 0.001 to 0.080 inch in thickness are common. For the purpose herein described, a transducer in the order of 0.50 to 0.80 inch is preferred.

The plates, 34, 38, are connected across a source of high frequency alternating or intermittent unidirectional voltage 76 which is capable of pulsing the transducer at frequencies in the order of 15,000 to 60,000 cycles or higher. In some installations where a transducer responsive to relatively low voltages is used, a parallel circuit from the gap power supply may be used to vibrate the transducer. Generally, however, gap supply voltages of approximately 40 volts are too low and a transducer pulse supply of 400 to 500 volts must be used.

The transducer must be designed for a vibration amplitude much smaller than the gap distance, preferably not more than one-tenth of the gap spacing. EDM is currently being carried on with gaps of from 0.0002 to 0.001 inch between the electrode and workpiece. To prevent contact between the electrode and workpiece, the electrode vibration must be less than this.

Preferably the length and mass of the electrode 42, spindle 36 and collet 44 are matched to the wave length of the frequency of source 76 such that the inherent resonant vibratory frequency will provide desired amplitude with small power requirement.

It will thus be seen that I have provided an improved means for electrospark machining which provides for high frequency vibration of the machining electrode at amplitudes sufficiently small to avoid actual contact between the electrode and work even when working with minute gap spacing. While the invention is susceptible of various modifications and alternative constructions, it should be understood that the specific disclosure herein is by way of example only and it is intended to cover the invention as broadly as the scope of the appended claims will permit.

I claim:

1. In an electrical machining apparatus, an electrode separated from a workpiece by a dielectric filled gap, an electrode support, a piezoelectric disc having its axes of mechanical vibration substantially aligned with the axis of said electrode, a pair of electrically conductive plates mounted on opposing sides of and abutting said piezoelectric disc and fixed to said electrode and electrode support, respectively, and a source of intermittent current pulses connected across said plates.

2. In an electrical machining apparatus, an electrode separated from a workpiece by a dielectric filled gap, an electrode support, a piezoelectric disc having its axes of mechanical vibration substantially aligned with the axis of said electrode, a pair of electrically conductive plates conductively bonded to opposite sides of said piezoelectric disc and fixed to said electrode and electrode support, respectively, and a source of intermittent current pulses connected across said plates.

3. In an electrical machining apparatus, an electrode separated from a workpiece by a dielectric, means operatively connected to said electrode for moving it toward and away from the workpiece to maintain a predetermined gap between said electrode and the workpiece, an electrode support, a source of intermittent current pulses, a piezoelectric transducer fixed between said electrode and said support and electrically connected across said source, said transducer having its direction of vibration along the axis of said electrode and an amplitude of vibration substantially less than the predetermined gap between said electrode and the workpiece.

References Cited in the file of this patent
UNITED STATES PATENTS

| | | |
|---|---|---|
| 2,766,364 | Higgins et al. | Oct. 9, 1956 |
| 2,805,320 | Palic | Sept. 3, 1957 |
| 2,818,490 | Dixon et al. | Dec. 31, 1957 |
| 2,903,556 | McKechnie | Sept. 8, 1959 |